United States Patent [19]

Tamura

[11] Patent Number: 4,490,805
[45] Date of Patent: Dec. 25, 1984

[54] HIGH SPEED MULTIPLY ACCUMULATE PROCESSOR

[75] Inventor: Poohsan N. Tamura, Bloomington, Minn.

[73] Assignee: Honeywell Inc., Minneapolis, Minn.

[21] Appl. No.: 419,667

[22] Filed: Sep. 20, 1982

[51] Int. Cl.³ .............................................. G06F 7/38
[52] U.S. Cl. ................................................... 364/728
[58] Field of Search .............. 364/728, 736, 754, 757

[56] References Cited
U.S. PATENT DOCUMENTS

| 3,500,027 | 3/1970 | Wyle | 364/728 |
| 3,748,451 | 7/1973 | Ingwersen | 364/728 |
| 4,287,566 | 9/1981 | Culler | 364/754 |

OTHER PUBLICATIONS

Swithers et al., "Fast Multiply" *IBM Tech. Disclosure Bulletin*, vol. 8, No. 11, Apr. 1966, p. 1492.
Swartzlander, Jr. et al. "Inner Product Computers" *IEEE Trans. on Computers*, vol. C-27, No. 1, Jan. 1978, pp. 21–31.

*Primary Examiner*—David H. Malzahn
*Attorney, Agent, or Firm*—Stephen W. Buckingham

[57] ABSTRACT

A system utilizing a plurality of accumulators performing additions and shift and add operations is used to perform a multiply accumulate function at a very high speed.

8 Claims, 1 Drawing Figure

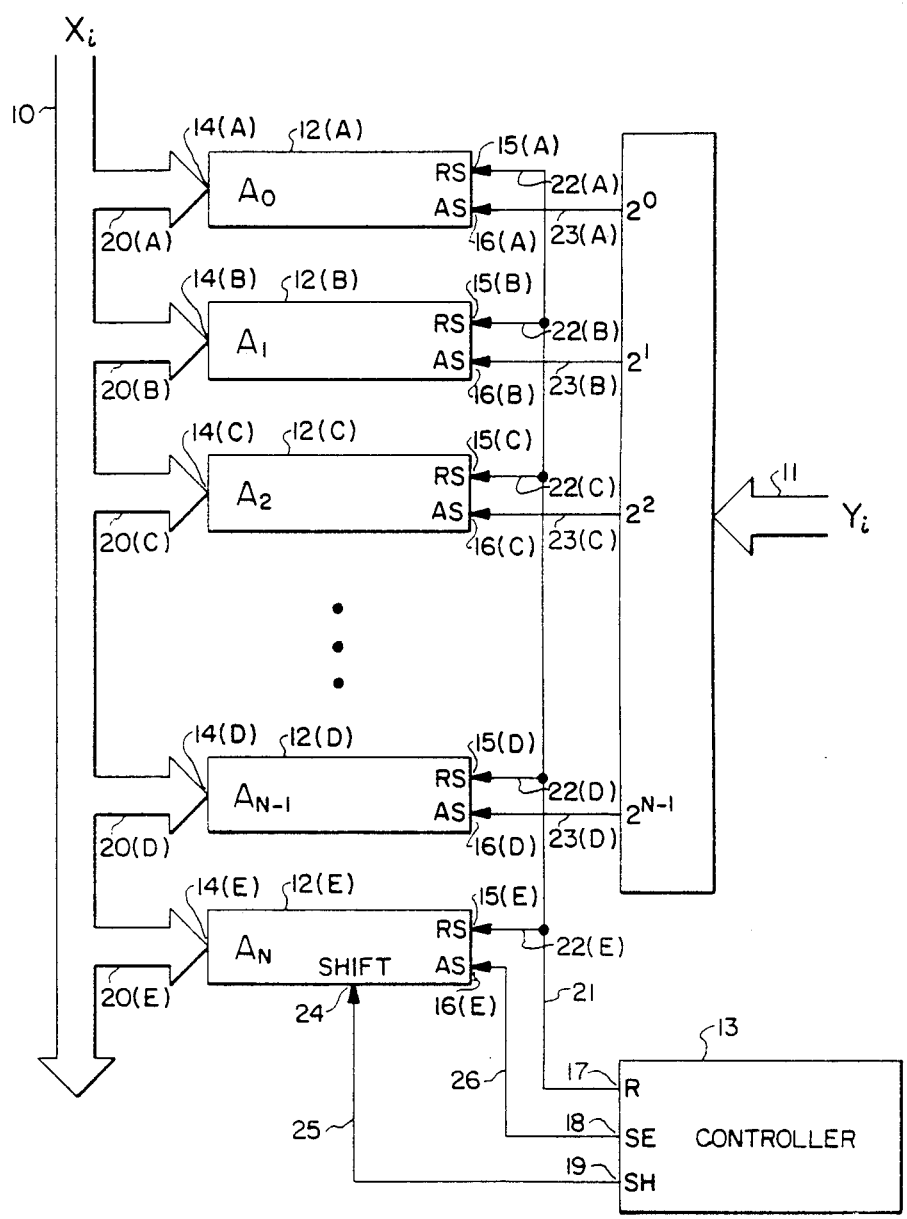

HIGH SPEED MULTIPLY ACCUMULATE PROCESSOR

BACKGROUND OF THE INVENTION

One of the most common operations arising in the field of digital signal processing is that often known as the multiply accumulate operation. An example where such an operation is used is in the calculation of the inner product of two vectors. If $\vec{X}$ and $\vec{Y}$ are vectors in a space having T orthogonal dimensions, the inner product, Z, is defined to be $$Z = \sum_{i=0}^{T-1} X_i Y_i \quad . \tag{1}$$

where $X_i$ is the $i_{th}$ component of $\vec{X}$ and $Y_i$ is the $i_{th}$ component of $\vec{Y}$. Using prior art procedures Z is calculated by producing the products $X_i Y_i$ and accumulating the results for all values of i. If T is large the number of such multiplications will also be large and the process may consume a significant fraction of the time required to perform the signal processing task at hand. A system which could perform a multiply accumulate function while bypassing the repetitive multiplications would therefore reduce the time required for many signal processing procedures.

SUMMARY OF THE INVENTION

The present invention uses a plurality of accumulators performing shift operations and additions to execute a multiply accumulate function. Because multiplication is typically a more time consuming operation in a digital computer than is either a shift operation or addition, the present invention provides a more rapid system for performing a multiply accumulate function.

BRIEF DESCRIPTION OF THE DRAWING

The sole FIGURE is a block diagram of the apparatus of the invention.

DESCRIPTION OF A PREFERRED EMBODIMENT

In order to understand the operation of the invention a more detailed examination of equation (1) is required. The components $X_i$ of the vector $\vec{X}$ may be represented in binary form as M bit data and the components $Y_i$ of the vector $\vec{Y}$ may be represented as N bit data. Typically M will be equal to N and that will be assumed to be the case for the remainder of this discussion. In that case the following equations apply:

$$X_i = \sum_{j=0}^{N-1} X_{ij} 2^j \tag{2}$$

$$Y_i = \sum_{k=0}^{N-1} Y_{ik} 2^k \tag{3}$$

where $X_{ij}$ and $Y_{ij}$ are equal to one or zero. Then equation (1) becomes $$Z = \sum_{i=0}^{T-1} \left( \sum_{j=0}^{N-1} X_{ij} 2^j \right) \left( \sum_{k=0}^{N-1} Y_{ik} 2^k \right) \tag{4}$$

The order of summation may be changed to yield $$Z = \sum_{k=0}^{N-1} 2^k \left[ \sum_{i=0}^{T-1} Y_{ik} \left( \sum_{j=0}^{N-1} X_{ij} 2^j \right) \right] \tag{5}$$

which may be simplified to $$Z = \sum_{k=0}^{N-1} 2^k \left( \sum_{i=0}^{T-1} Y_{ik} X_i \right) \tag{6}$$

In order to use equation (6) N sums are produced, one corresponding to each value of k. Each sum is equal to $$\sum_{i=0}^{T-1} Y_{ik} X_i$$

for a specific value of k. In order to do this N accumulators are set to zero. If for particular values of i and k $Y_{ik}$ is equal to one, $X_i$ is added to the value in the appropriate accumulator. If $Y_{ik}$ is equal to zero, nothing is added to the accumulator associated with that value of k during that cycle. After the N sums have been calculated each is multiplied by its appropriate weighting factor, i.e. $2^k$, and all are added to obtain the value of Z.

The invention, as shown in the FIGURE, includes data buses 10 and 11, accumulators 12(A), 12(B), 12(C), 12(D), and 12(E), and controller 13. Although five accumulators are shown in the FIGURE, more would typically be used in an implementation of the invention. Typically N+1 accumulators would be used where the components $Y_i$ to be processed by the system are represented by N bit data.

Accumulators 12(A) through 12(D) are similar to one another in their structure and their electrical connections to the remainder of the system. Therefore, accumulator 12(A) will be described with the understanding that accumulators 12(B), 12(C), and 12(D) are similar. Accumulator 12(A) has a data port, 14(A), a reset input terminating region, 15(A), and an accumulator select input terminating region, 16(A). Controller 13 has a reset output terminating region, 17, a select output terminating region, 18, and shift output terminating region, 19. Data port 14(A) of accumulator 12(A) is electrically connected to data bus 10 by connection means 20(A). Signal line 21 is electrically connected to reset output terminating region 17 of controller 13. Signal line 22(A) is in turn electrically connected to signal line 21 and to reset input terminating region 15(A) of accumulator 12(A). The signals from reset output terminating region 17 of controller 13 are directed to reset input terminating region 15(A) of accumulator 12(A). Signal line 23(A) is electrically connected to accumulator select input terminating region 16(A) of accumulator 12(A). Signal line 23(A) is adapted to carry the least significant bit, i.e. the 20 bit, of the data being carried by data bus 11.

Accumulator 12(E) has data port 14(E), reset input terminating region 15(E), accumulator select input terminating region 16(E), and shift input terminating region, 24. Data port 14(E) is electrically connected to data bus 10 by connection means 20(E). Shift input terminating region 24 is electrically connected to shift output terminating region 19 of controller 13 by means of signal line 25. Accumulator reset input terminating region 15(E) is electrically connected to signal line 22(E), which in turn is electrically connected to signal line 21. Signal line 21 is, as described above, electrically connected to reset output terminating region 17 of controller 13. Accumulator select input terminating region 16(E) is electrically connected to select output terminating region 18 of controller 13 by means of signal line 26.

The above explanation describes the electrical connections in the system of the invention. Before the operation of the system begins the signals SELECT, which appears at select output terminating region 18 of controller 13, and SHIFT, which appears at shift output terminating region 19 of controller 13, are set to the system low voltage level. These signals are transmitted via lines 26 and 25 to accumulator select input terminating region 16(E) and shift input terminating region 24 of accumulator 12(E), respectively. During the first portion of the operation of the system these signals will remain at the system low voltage level preventing accumulator 12(E) from executing either an addition operation or a shift operation. The actual evaluation of equation (6) begins with the signal RESET, which appears at reset output terminating region 17 of controller 13, taking on the system high voltage level. This signal is transmitted to reset input terminating regions 15(A) through 15(E) of accumulators 12(A) through 12(E), via signal lines 21 and 22(A) through 22(E). The appearance of the system high voltage level on reset input terminating regions 15(A) through 15(E) causes accumulators 12(A) through 12(E) to be cleared, i.e. to have the values stored therein set equal to zero. After all of the accumulators have been cleared RESET returns to the system low voltage level and remains at that level for the remainder of the calculations.

After all of the accumulators have been cleared $X_0$ is transmitted to accumulators 12(A) through 12(E) by data bus 10 and connection means 20(A) through 20(E). At the same time $Y_0$ is sent to data bus 11. From data bus 11 the least significant bit of $Y_0$ is directed to line 23(A) and hence to accumulator select input terminating region 16(A) of accumulator 12(A). Similarly, the next to the least significant bit is transmitted to accumulator select input terminating region 16(B) of accumulator 12(B). The accumulator select input terminating region of the remaining accumulators are similarly connected so that each accumulator, except accumulator 12(E), receives one of the bits from $Y_0$ at its respective accumulator select input terminating region. For those bits of $Y_0$ which have a value of one, the system high voltage level will be applied to the appropriate accumulator select input terminating region, while those bits having a value of zero will cause the system low voltage level to be applied to the appropriate accumulator select input terminating regions. An accumulator receiving the system high voltage level at its respective accumulator select input terminating region will be enabled, causing the value appearing at the respective accumulator data port to be added to the value stored in the accumulator. An accumulator receiving the system low voltage level at its respective accumulator select input terminating region will be disabled and the value stored in the accumulator will remain unchanged. After this procedure has been followed for $X_0$ and $Y_0$ a similar procedure is followed for $X_1$ and $Y_1$. The same procedure is then followed until all values of $X_i$ and $Y_i$ have been so processed.

After the procedure described thus far has been executed, accumulators 12(A) through 12(D) will have values stored therein determined by the various values of $X_i$ and $Y_i$ used. Accumulator 12(E) will have zero stored therein because, as described above, the SELECT signal provided to accumulator select input terminating region 16(E) from controller 13 has remained at the system low voltage level throughout thereby disabling accumulator 12(E). The SELECT signal now takes on the system high voltage level, thus enabling accumulator 12(E). The value stored in accumulator 12(D) is now transferred to data port 14(E) of accumulator 12(E) via connection means 20(D), data bus 10, and connection means 20(E). Because accumulator 12(E) is now enabled the value arriving at data port 14(E) is added to the values stored in the accumulator. The signal SHIFT, emanating from shift signal output terminating region 19 of controller 13, now takes on the system high voltage level. This signal, which is applied to shift input terminating region 24 of accumulator 12(E), causes the accumulator to shift each bit of the value stored therein to the left. That is, the least significant bit becomes zero, the value of the next to the least significant bit takes on the value formerly held by the least significant bit and so forth. Effectively the shift operation is equivalent to multiplying the value stored in accumulator 12(E) by 2. The value stored in accumulator $A_{n-2}$, which may or may not be accumulator 12(C) depending upon how many accumulators are in use, is now added to the value stored in accumulator 12(E) and another shift operation performed. The same procedure continues until the values from all of the accumulators have been added to the value in accumulator 12(E) with a shift operation being executed between each addition. No shift operation is performed after the value from accumulator 12(A) is added to the value in accumulator 12(E). The value in accumulator 12(E) following the addition of the value from accumulator 12(A) is equal to Z as defined by equation (6).

The explanation given above describes the operation of a preferred embodiment of the invention. Other structures are possible within the scope of the invention, however. For example, rather than providing N+1 accumulators, N accumulators might be provided. In this case the shift and add operations may be performed in one of the accumulators used in the first portion of the operation. Preferably accumulator 12(D) might be used. Those skilled in the art will see other variations which may be made within the scope of the present invention.

The embodiments of the invention in which an exclusive property or right is claimed are defined as follows:

1. Apparatus for calculating the sum of the products of pairs of numbers, each of said pairs of numbers having a first member taken from a first set of numbers and a second member taken from a second set of numbers, each of said numbers of said first set being represented by M bit binary data and each number of said second set being represented by N bit binary data, said apparatus comprising:

a plurality of accumulator means, each of said accumulator means having a data port and an accumulator means select input terminating region;

a first data bus adapted to carry signals representative of said first members of said pairs of numbers, said first data bus further adapted to provide said signals representative of said first members of said pairs of numbers to said data ports of said accumulator means; and a second data bus adapted to carry signals representative of said second members of said pairs of numbers, said second data bus further being adapted to provide signals representative of individual bits of said N bits of said second members of said pairs of numbers to said accumulator means select input terminating regions.

2. The apparatus of claim 1 wherein said plurality of accumulator means comprises N accumulator means.

3. The apparatus of claim 2 further comprising:
a controller means having a select output terminating region and a shift output terminating region, said controller means being adapted to provide a first predetermined signal at said select output terminating region and a second predetermined signal at said shift output terminating region;
an additional accumulator means having a data port, an accumulator means select input terminating region, and a shift input terminating region, additional accumulator means data port being adapted to receive signals from said first data bus, said accumulator means select input terminating region of said additional accumulator being adapted to receive said first predetermined signals from said controller means select output terminating region and said accumulator means shift input terminating region being adapted to receive said second predetermined signals from said controller means shift output terminating region, said additional accumulator means being adapted to execute a bit shift operation when said second predetermined signal is received by said accumulator means shift input terminating region.

4. The apparatus of claim 3 wherein said controller means further has a reset output terminating region adapted to provide a third predetermined signal and each of said accumulator means of said plurality thereof and said additional accumulator have a reset input terminating region adapted to receive said third predetermined signal, each of said accumulator means being adapted to have a value stored therein set equal to zero when said third predetermined signal is received at its respective accumulator means reset input terminating region.

5. The apparatus of claim 1, claim 2, claim 3, or claim 4 wherein M is equal to N.

6. The apparatus of claim 3 or claim 4 wherein said second data bus is adapted to provide each of said individual bits of said N bits to exactly one of said accumulator means select input terminating regions of said accumulator means of said plurality thereof and each of said accumulator means select input terminating regions of said accumulator means of said plurality thereof is adapted to receive exactly one bit of said N bits, each of said accumulators of said plurality thereof being adapted to be enabled when receiving a bit equal to a binary one at its respective accumulator means select input terminating region and to be disabled when receiving a bit equal to a binary zero at its respective accumulator means select input terminating region.

7. The apparatus of claim 6 wherein each of said accumulator means of said plurality thereof is adapted to calculate a sum of selected numbers of said first set of numbers and said additionl accumulator means is adapted to add said sums together, said additional accumulator means performing a bit shift operation between addition steps.

8. The apparatus of claim 7 wherein M is equal to N.

* * * * *